April 27, 1943.  W. E. MENZIES ET AL  2,317,630

MOTOR CONTROL

Filed Nov. 4, 1939

INVENTORS
WILLIAM E. MENZIES
AND CALVIN J. WERNER
BY Spencer, Hardman and John
ATTORNEYS Patented Apr. 27, 1943

2,317,630

UNITED STATES PATENT OFFICE 2,317,630

MOTOR CONTROL

William E. Menzies and Calvin J. Werner, Dayton, Ohio, assignors to General Motors Corporation, Detroit, Mich., a corporation of Delaware Application November 4, 1939, Serial No. 302,799

15 Claims. (Cl. 172—279)

This invention relates to improvements in control devices for electric motors and particularly for electric motors used to drive refrigeration apparatus.

It is among the objects of the present invention to provide the driving motor of a refrigerating apparatus with an automatic control device which is adapted to control the operation of said motor in accordance with the varying temperatures of a part of said refrigerating apparatus, for instance, the evaporator thereof.

A further object of the present invention is to provide the control device with a manually operable mechanism capable of adjusting the device to render the electric motor inoperative until the evaporator of the refrigerating apparatus is completely defrosted at which time the higher temperature thereof will effect operation of the device to again render the motor operative.

Further objects and advantages of the present invention will be apparent from the following description, reference being had to the accompanying drawing wherein a preferred embodiment of the present invention is clearly shown.

Figure 1:
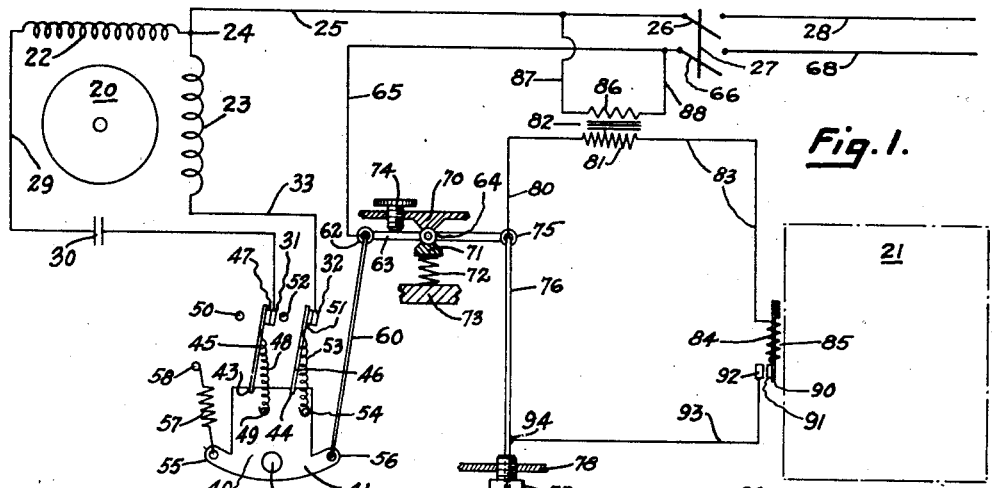
Fig. 1 is a diagrammatic view illustrating one form of the present invention.

Referring to the drawing and particularly to Fig. 1, the motor which drives the refrigerating apparatus is designated by the numeral 20. This motor 20 is to be controlled in accordance with varying temperatures of the evaporator 21, shown in dot-and-dash line. The motor 20 has a starting winding 22 and a running winding 23; the one end of the starting winding 22 is joined with the one end of the running winding 23 at the point 24. A wire 25, electrically connected with the windings 22 and 23 at the point 24, leads to the one movable contact 26 of the switch 27, which, when closed, is adapted to connect wire 25 with the one power supply line 28. Another end of the starting winding 22 has a wire 29 connected thereto which leads to a condenser 30, then to the stationary contact 31 of the control switch 40. The other stationary contact 32 of this control switch has a wire 33 leading therefrom which wire is connected to the end of the running winding 23.

The motor control switch 40 comprises a main body portion 41 pivotally carried by the pin 42. This switch has two notches 43 and 44 providing seats for the contact arms 45 and 46 respectively. Contact arm 45 has a contact 47 adapted to cooperate with stationary contact 31. A spring 48 interposed between arm 45 and a pin 49 on the switch body 41 will quickly flip arm 45 in one direction or the other to engage either the stationary contact 31 or stop pin 50, dependent upon the direction of rotation of the switch body 41, upon its pivot pin 42. Contact arm 46 has a contact 51 adapted to engage contact 32, said switch arm 46 being flipped toward contact 32 or toward the stationary stop pin 52 by spring 53 interposed between arm 46 and the anchor pin 54 on switch body 41.

The body 41 of the switch 40 has two oppositely disposed ears 55 and 56. A spring 57 has one end connected to the ear 55 of the switch 40, the other end being anchored to the stationary pin 58. This spring 57 is adapted to move the switch body 41 clockwise about its pivot pin 42 and in response to such clockwise movement arm 45 will first be moved from engagement with its stationary contact 31 by spring 48 into engagement with the stop pin 50 after which arm 46 will be moved by its spring 53 out of engagement with its stationary contact 32 into contact with the stop pin 52. Thus it may be seen that under the effect of the spring 57 switch body 41 is moved successively to break first the starting circuit of the motor, then the running circuit thereof.

The other ear 56 of switch body 41 has one end of a thermo-electric element 60 electrically connected therewith, the opposite end of this element being secured to one end 62 of the lever 63 which lever is pivoted substantially centrally at its hub 64. A wire 65, connected to the lever 63 at the end 62, is also electrically connected to thermo-electric element 60. This wire 65 leads to the movable contact member 66 of switch 27 which, when closed, connects wire 65 with the other power supply line 68.

As has been stated before lever 63 is pivoted or hingedly supported substantially centrally at its hub 64. This hub 64, provided on the lever 63 hingedly engages a seat in the stationary wall 70. The hub 64 is maintained in yieldable engagement with said seat by a thrust block 71 urged into engagement with the hub 64 by a spring 72 interposed between said thrust block 71 and a stationary wall 73 of the device. A thumb screw 74 in the stationary wall 70 provides a stop for lever 74 and may be adjusted to limit the clockwise movement of said lever.

The end of lever 63 opposite end 62 is designated by the numeral 75. To this end of lever 63 is connected one end of thermo-electric element 76, the opposite end of which is secured to a thumb screw 77 adjustably carried by the stationary wall 78 of the device. A wire 80 is electrically connected to the end of the thermo-electric element 76 secured to lever 63. This wire 80 leads from the thermo-electric element 76 to one end of the secondary winding 81 of a transformer 82, the opposite end of said secondary winding having a wire 83 attached thereto which leads to one end of the heater coil 84 of the thermo-electric switch 85. This transformer 82 has a primary winding 86, one end of which is connected to the wire 25 through the lead wire 87, the opposite end being connected to wire 65 through the wire 88.

The thermal switch 85 is in juxtaposition to the evaporator 21 so that the bimetallic contact arm 90 of said switch will be affected by the ambient temperature of said evaporator. One end of the heater coil 84 is electrically connected with said contact arm 90. This contact arm supports a contact 91 adapted to cooperate with stationary contact 92 which has a wire 93 leading therefrom and electrically connected to thermo-electric element 76 at the point 94.

The thermo-electric elements 60 and 76 connected to the respective ends 62 and 75 of the lever 63 are adapted to control or actuate the switch 40 in accordance with and in response to current flow through said elements. The thermo-electric element 60 attached to the ear 56 of the switch body 41 opposes the effort of spring 57 to rotate said switch body clockwise. Normally these elements 60 and 76 maintain the switch body 41 in the position as shown in Fig. 1, so that the arms 45 and 46 of said switch 40 are in a position to cause engagement of their contacts 47 and 51 with the respective stationary contacts 31 and 32 of said switch. A predetermined current flow through either one of these thermo-electric elements 60 or 76 will result in heating up and consequent expansion thereof, thus permitting the spring 57 to become effective to rotate switch body 41 clockwise to break said contact engagements and thus render the motor inoperative. If, when the switch 40 is in the position as shown in Fig. 1, and the main switch 27 is closed so that its movable contacts 26 and 66 engage the power supply lines 28 and 68 respectively, the motor circuits will be completed as follows: Current will flow from the supply line 28 through movable contact 26 of switch 27 across wire 25 to the point 24 where a divided flow will obtain. One circuit from point 24 leads through the starting winding 22, through wire 29 and condenser 30 to the stationary contact 31 of switch 40. From contact 31 the current will flow through contact 47 and its arm 45 to the body 41 of the switch 40, thence through the thermo-electric element 60 to the wire 65 connected with said element at the end 62 of lever 63. From wire 65 the circuit will be completed through the movable contact 66 of switch 27 to the opposite power supply line 68. This completes the circuit through the starting winding of the motor 20. The other part of the divided circuit flows from point 24 through the running winding 23, wire 33 to the stationary contact 32, thence through the movable contact 51 engaging contact 32, arm 46 and thence back to the power supply line 68 via the body 41, thermal element 60, wire 65 and movable contact 66 of the switch 27. The starting and running circuits of the motor 20 being completed will cause said motor to operate and drive the refrigerating apparatus. The first surge of the starting current through the thermo-electric element 60 is substantially large and thus will cause it to become heated and expand to a predetermined degree. Expansion of this element 60 permits spring 57 to become effective to rotate switch body 41 clockwise about its pivot pin 42 and when this rotation is permitted for a predetermined distance contact arm 45 will suddenly be flipped counterclockwise by its spring 48 so that contact 47 is disengaged from contact 31 and arm 45 will be moved into engagement with the stop pin 50. Now it may be seen that the circuit through the starting winding 22 is broken while yet the circuit through the running winding 23 is maintained. The flow of current through the thermo-electric element 60 for ordinary motor operation will not be sufficiently high to cause increased heating and further expansion of element 60 and consequently spring 57 will not become effective to rotate switch body 41 sufficiently to disengage contact 51 from the contact 32. However, if, under any circumstances the motor 20 is overloaded or is stalled, then an abnormal flow of current through the running winding and also thermo-electric element 60 will obtain resulting in a greater heating up thereof and a consequent greater expansion. This increased expansion of element 60 due to the increased current flow therethrough will permit spring 57 further to actuate switch body 41 clockwise about its pivot pin 42 so that the contact arm 46 will be flipped by its spring 53 into engagement with the stop pin 52, breaking the motor circuit across contacts 32 and 51. Thus it may be seen that thermo-electric element 60 controls the starting circuit and also provides a protective device adapted to render the motor entirely inoperative if and when said motor is subject to abnormal operating conditions.

The switch 40 of the present invention is adapted not only to control the starting and running of the motor in accordance with motor conditions, but it also is adapted to control said motor in response to and in accordance with variations in temperature ambient to the evaporator 21 of the refrigeration apparatus. When the temperature ambient to said evaporator 21 reaches or drops below the chosen reference temperature of 40° F., contact arm 90 will flex so that it urges its contact 91 into engagement with the contact 92 thus completing the circuit including the thermo-electric element 76, the secondary winding 81 of the transformer 82 and the heater coil 84 of thermal switch 85. Under these circumstances, this circuit will remain closed until the heater coil 84 radiates sufficient heat to overcome the effect of the lower ambient temperature and thereby cause flexing of the thermo-element or strip 90 so that its contact 91 will be moved from engagement with contact 92 to break the circuit. Now thermo-element or strip 90 may cool and again flex to close said circuit. This operation of the thermo-element 90 is repeated, providing for intermittent closing and opening of this control circuit. When the closing intervals of contacts 91 and 92 are of sufficient duration due to lowering temperature ambient to the evaporator 21, the current flow through the circuit will heat up the thermo-electric element 76 and cause its expansion. The effort of spring 57 tending to rotate switch body 41 clockwise, will exert a pull on the thermo-electric element 60 and a consequent pull on the end 62 of lever 63. This will take up the slack in element 76, caused by its expansion and thus, if such expansion is sufficient, spring 57 may actuate switch body 41 to cause flipping of contact arms 45 and 46 to open their respective starting and running circuits of the motor, thereby rendering the motor inoperative and stopping refrigeration. Now the evaporator may warm up and its ambient temperature rise.

When the temperature ambient to the evaporator and thus at the control or thermal switch 85 increases, the thermal element 90 of said switch will be affected to decrease the energy passing through the circuit including switch 85 and the thermo-electric element 76. As this energy level reaches the reset value of switch 40, thermo-electric elements 60 and 76 will again be effective to actuate switch 40 to close the motor circuits and reestablish refrigeration.

In order to vary the reference temperature so that the evaporator 21 will operate cooler if desired, adjusting nut 77 is actuated to shorten the thermo-electric element 76 thereby requiring a greater flow of current for a longer period of time to heat said thermo-electric element sufficiently to permit it to expand to the proper switch tripping length. On the other hand if a higher temperature is desired at the evaporator the adjusting screw 77 will be released, thus lengthening the thermo-electric element 76.

Lever 63 has its hub 64 hingedly secured between the stationary seat 70 and the yieldably supported thrust-block 71. Spring 72 urges block 71 against the hub 64 of lever 63, the strength of the spring 72 being such that it will maintain a predetermined normal stress upon the elements 60 and 76. However, if the operator actuates the adjusting nut 77, tending to shorten the thermo-electric element 76, spring 72 would yield and permit the hub supporting block 71 to move downwardly in response to such adjustment of nut 77 before any harmful stretching of the element 76 would result. From this it may be seen that the reference temperature at the evaporator 21 may be varied by adjusting nut or screw 77. If this screw is actuated to shorten the element 76 and consequently exert an increased tension on the element 60 more current flow through these elements is necessary to provide sufficient expansion thereof to permit spring 57 to actuate the switch 40 into the motor circuit breaking position. If the element 76 requires a greater current flow through it to heat it up sufficiently so that it may expand and permit actuation of the switch 40, then naturally the period of closure of contacts 91 and 92 must be increased. As has been stated, contacts 91 and 92 engage by flexing element 90 in response to lowering temperatures ambient to the evaporator 21 and therefore to increase the contact-making interval the ambient temperature must necessarily be of a lowering degree. It may readily be seen that increased tension of the thermo-electric element 76 will require increased contact-making interval to provide the necessary energy sufficiently to warm up said thermo-electric element so that it can expand and permit operation of the switch 40 to control the motor circuits.

Figure 2:
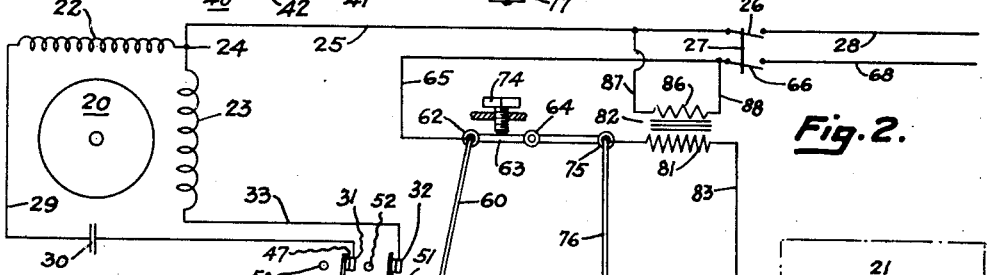
Fig. 2 is a view similar to Fig. 1 provided however with an additional defrosting mechanism.

Fig. 2 illustrates another form of the present invention. It differs only from that shown in Fig. 1, in that here an automatic control for defrosting purposes is provided. All other control devices and their circuits are, however, substantially identical. In Fig. 2, lever 63 does not have its hub 64 yieldably supported as in Fig. 1, but on the contrary said hub 64 may be carried by any suitable stationary portion of the device. The parts and circuits of Fig. 2 identical with the parts and circuits of Fig. 1 are given the same reference numerals.

The defrosting control mechanism of Fig. 2, comprises a lever 100 pivoted at the point 101. A spring 102, interposed between the lever 100 and a stationary part 103 of the mechanism urges the lever clockwise so that a portion thereof engages the stationary stop member 104 when said lever is in normal position. An adjustable screw 105 carried by the stationary portion 106 of the mechanism provides a stop member for the lever, limiting its movement manually in a counterclockwise direction. An adjustable screw 107 is carried by the lever 100 and forms an anchorage for one end of the thermo-electric element 76 of Fig. 2, the opposite end of said element being electrically connected with one end of the secondary coil 81 of transformer 82. The switch body 41 of this Fig. 2 has a depending lug 110. An upwardly extending angular end 111 of lever 100 lies in the path of movement of the lug 110 when lever 100 is in its normal position. Normally spring 102, urging lever 100 against stop 104, causes said lever to exert a predetermined tension upon the thermo-electric element 76. This element, acting through lever 63, the said exerts normal tension upon the thermo-electric element 60 of the switch 40. Under these normal conditions automatic control of the motor 20 in accordance with temperatures ambient to the evaporator 21 as previously described is obtained.

Prolonged use of the refrigeration apparatus generally results in frosting of the evaporator. This frosting on the evaporator may be eliminated by stopping the motor and discontinuing refrigeration. To defrost, the operator exerts a pressure upon the right end of the lever 100 moving said lever counterclockwise until it engages the stop screw 105. This counterclockwise movement of lever 100 removes its angular end 111 out of the path of movement of the lug 110 of switch 40. It also causes slackening of the thermo-electric element 76 and consequently the thermo-electric element 60. Slackening of element 60 permits spring 57 to become effective to rotate the switch 41 clockwise causing the contact arms 45 and 46 of the switch to be moved to circuit open positions where they will engage their respective stop pins 50 and 52 and thus render the motor inoperative.

Under normal operating conditions, the clockwise rotation of the switch body by spring 57 is limited by the angular end 111 of lever 100 lying in the path of movement of the lug 110 on said switch body 41. However, when this lever 100 is moved to the defrosting position, the angular portion 111 thereof is moved out of the path of movement of the lug 110 of the switch body 41 so that under this defrosting condition spring 57 may rotate switch body 41 clockwise through a greater range than normally, in fact it may rotate the body of the switch until its lug 110 will engage stop pin 112. Release now, of the lever by the operator will not permit it to return to normal position for the end of its angular portion 111 will engage with and ride upon the end of lug 110 on the switch body, thus holding said lever 100 in the defrosting position in which elements 60 and 76 are properly slacked.

The refrigeration cycle now being discontinued due to the motor being rendered inoperative, evaporator 21 will gradually grow warmer and as the temperature ambient thereto rises to and above the reference temperature contact-carrying-bimetallic strip 90 will flex to move its contact 91 out of engagement with the cooperating contact 92 to break the circuit through the thermo-electric element 76. Now the element 76, not subjected to heat due to current flow therethrough will cool and contract. Eventually thermo-electric element 76 will cool sufficiently to cause a contraction therein which will result in a pull upon the lever 63 to move it clockwise about its hub 64. Clockwise movement of lever 63 must necessarily tension thermo-electric element 60 resulting in a rotation of the switch body 41 counter-clockwise about its pivot pin 42 and a reclosing of contacts 47—31 and 51—32 to establish motor operation. Such rotation of the switch body 41 will move the lug 110 thereof from engagement with the end surface of the angular portion 111 of lever 100. When this occurs spring 102 will quickly move the lever 100 into its normal position as shown in Fig. 2 in which the lever will again engage the stop member or block 104. Now the lever under the effect of spring 102, will again normally tension element 76 and by acting through lever 63, said element 76 will properly tension the thermo-element 60 for normal motor operative control. Naturally screws 105 and 107 are so adjusted that the refrigeration cycle is reestablished only after the evaporator 21 has been properly defrosted.

Figure 3:
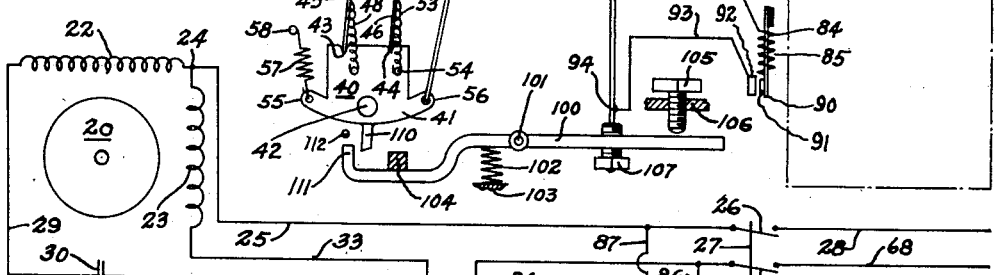
Fig. 3 illustrates the control device with still another form of automatic defrosting mechanism.
Figure 4:
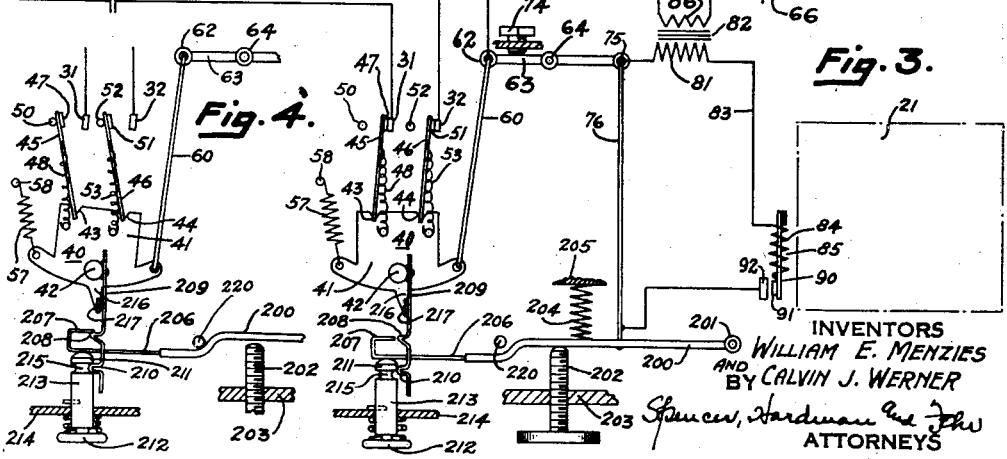
Fig. 4 illustrates the control switch and defrosting mechanism of Fig. 3 in another position.

The control mechanism illustrated in Figs. 3 and 4 is substantially identical with that shown in Fig. 2, the only difference being in the defrosting control mechanism.

The defrosting control mechanism of Figs. 3 and 4 comprises a lever 200 pivoted at its one end at the point 201. The thermo-electric element 76 of Figs. 3 and 4 has one end attached to the lever 200, the other end to the lever 63. Beneath the lever 200 there is provided an adjustable stop screw 202 threadedly carried by any suitable stationary part 203 of the mechanism. A spring 204 interposed between lever 200 and a stationary part 205 of the mechanism normally urges the lever 200 into engagement with the adjustable stop screw 200 thereby tending to stretch the thermo-electric element 76, this tension being variable by the adjustment of the screw 202. An extension 206 on the lever 200 has a portion 207 adapted to be engaged by a hump 208 in the detent strip 209 as will be described. This detent strip 209 has its one end anchored to the rigid pivot pin 42 of the switch 40. A second hump 210 in said strip and adjacent its outer free end normally rests upon the inner cylindrical end 211 of defrosting button 212, which has its main body portion 213 slidably supported in a stationary portion 214 of the device. An annular groove 215 is provided between the body portion 213 and the cylindrical portion 211 of the defrosting button.

The switch body portion 41 has a depending lug 216 which moves beneath the plane of the detent strip 209. However, lug 216 has an angular extension 217 projected upwardly so as to engage said detent strip 209 when the switch body 41 is in normal position as shown in Fig. 3. Normally then detent strip 209 is held so that its hump 208 is not engageable with the portion 207 of lever 200, the angular extension 217 of lever 200 of body lug 216 holding it in this position as well as the hump 210 of strip 209 resting upon the cylindrical portion 211 of the defrosting button. When the defrosting button is in normal position its inner end merely touches the extension 206 of the lever 200. Under these conditions normal tension is maintained on the thermo-electric elements 60 and 76 of Fig. 3, permitting them to perform their normal function of motor control in accordance with variations in the temperature ambient to the evaporator 21.

If it is desired to defrost, the attendant pushes upon the defroster button 212 from the position shown in Fig. 3 into the position shown in Fig. 4. By so pushing the defroster button 212 lever 200 is moved clockwise about its pivotal point 201 so that it will engage the stop pin 220 in which position the portion 207 of said lever is adapted to be engaged and retained by the hump portion 208 of the detent strip 209. This operation of the button 212 also places the annular groove 215 in alignment with hump 210 providing a space into which said hump may fit as shown in Fig. 4. The shifting of lever 200 clockwise until the stop pin 220 is engaged, slackens the thermo-electric element 76. The thermal element 60 will therefore also be slackened for both elements 60 and 76 are mechanically connected through the pivoted lever 63. This slackening of element 60 permits the switch spring 57 of Fig. 3 to become effective to rotate switch body 41 clockwise about its stationary pivot pin 42, thus moving the extending lug portion 217 of the switch body away from the detent strip 209. Now said detent strip may move so that its hump 208 will engage and retain portion 207 of the lever 200 to hold said lever in this operated position. At the same time hump 210 will have entered the annular groove 215 of the defrosting button 212 to hold said button in this operated position. Naturally when the switch body 41 is actuated clockwise by spring 57 contact arms 45 and 46 of the switch will be moved from contact engaging position into engagement with the respective stop pins 50 and 52 thereby rendering the electric motor inoperative and stopping refrigeration.

All adjustments are made initially so that when the evaporator has properly been defrosted the element 76 will have cooled and contracted sufficiently to so tension the thermal element 60 that it will actuate the switch body 41 counterclockwise against the effect of spring 57 thereby again actuating the contact arms 45 and 46 into circuit-making position to reestablish refrigeration. When the thermal element 60 actuates the switch body 41 counterclockwise, lug 217 of the switch will strike the detent plate 209 and thereby move it counter-clockwise so that its humps 208 and 210 disengage lever portion 207 and the defrosting pin or button 212. This permits return of the defrosting button 212 and the lever 200 to their normal positions in which said lever 200 engages the adjusting screw 202 thereby permitting the spring 204 to again exert its normal tensioning pressure upon the thermo-electric element 76.

In the present invention applicants have provided an automatic control device for an electric motor, particularly used to drive refrigeration apparatus, this automatic control device regulating the operation of the motor in accordance with temperatures ambient to the evaporator of the refrigeration apparatus. The device is set initially so that if the temperature ambient to the evaporator rises above a predetermined reference temperature the device will render the motor operative to institute refrigeration and thus bring the temperature down to a predetermined degree. When on the other hand, the temperature ambient to the evaporator drops below the predetermined reference temperature then the device becomes effective to render the motor inoperative causing a cessation in refrigeration.

The invention also provides for a manual control operable to render the motor inoperative for defrosting purposes, which, when completed, causes the manual control to be released to set the device to its normal position for normal refrigeration control.

While the embodiment of the present invention as herein disclosed, constitutes a preferred form, it is to be understood that other forms might be adopted, all coming within the scope of the claims which follow:

What is claimed is as follows:

1. In a device of the character described, the combination of an electric motor having starting and running circuits adapted to be connected to a source of electrical energy; of a switch for controlling said circuits; thermo-electric means for effecting actuation of said switch in accordance with current flow through said motor circuits; a second thermo-electric means mechanically connected to the first mentioned thermo-electric means and adapted in response to current flow therethrough to move said first mentioned means to effect actuation of the switch; a source of electrical energy connected to said second thermo-electrical means; and a thermal switch independent of and remote from the motor, in circuit with said second means and its source of energy for controlling the energization of said means by said current source in accordance with temperatures ambient only to said thermal switch.

2. In a device of the character described, the combination with an electric motor having a starting and a running circuit adapted to be connected to a source of electrical energy; of a switch adapted to control said circuits; means for actuating said switch in accordance with current flow through both motor circuits; a thermo-electric member mechanically connected to said switch actuating means for actuating the switch through said means; and a control circuit connected to the thermo-electric member, said circuit including a winding of an energy translating device fed from the source of electrical energy and a thermal switch independent of and remote from the motor, said thermal switch controlling the energization of the thermo-electric member by the energy translating device in accordance with temperature conditions ambient only to said thermal switch.

3. In a device of the character described, the combination with an electric motor having starting and running circuits adapted to be connected to a source of electrical energy; of a switch in said circuits; thermo-electric means effecting actuation of said switch in accordance with current flow through said circuits; a member mechanically secured to said thermo-electric means and adapted bodily to move said means to effect actuation of the switch; and means remote from the motor, comprising a transformer having a circuit connected to the source of energy and another to said member and a thermal switch connected to said member and adapted to render said transformer effective to energize said member to actuate the thermo-electric means in response to temperature variations ambient to said thermal switch.

4. Control apparatus for an electric motor having starting and running windings adapted to be brought into circuit with a source of electrical energy; a switch for opening and closing the circuits of both said windings; a temperature responsive actuator for said switch, in circuit with both said windings and rendered effective by variations in current flow through said windings; a thermal member mechanically connected to said actuator and adapted to exert a push or pull upon said actuator for moving the switch to open or close the motor circuits respectively; a transformer having one circuit connected to the source of electrical energy and the other circuit connected to the thermal member and adapted to energize and heat it whereby said member will expand to exert a push on said actuator; and a thermal switch, remote from and independent of the motor, and in circuit with the transformer and thermal member and adapted to control the energization of said thermal member in accordance with varying temperatures ambient to said thermal switch only.

5. Control apparatus for an electric motor having starting and running circuits adapted to be connected to a source of electrical energy; a thermo-electric switch for controlling said circuits in accordance with current flow therethrough; a thermo-electric member; a transformer connected to said source of energy and to said member for energizing said member to effect expansion thereof; a thermal switch remote from the motor in circuit with the thermo-electric member for controlling the effect of the transformer on said member in accordance with temperature variations ambient to said thermal switch; and a lever mechanically connecting the thermo-electric member with the thermo-electric switch for actuating the latter in accordance with actuation of the thermo-electric member.

6. In a device of the character described, the combination with an electric motor having starting and running circuits adapted to be connected to a source of electrical energy; a switch for controlling said circuits; two thermo-electric actuators for said switch, the first being directly connected to the switch and acting only in accordance with current flow through the motor to effect operation of said switch, the second actuator being mechanically attached to the first and adapted in response to current flow therethrough to effect actuation of the switch by increasing or decreasing its pull on said first actuator; a transformer having one winding connected to the source of electrical energy, the other winding connected to said second actuator for energizing it; and a thermal switch remote from the motor and in circuit with the transformer and adapted to control its energization of the second actuator in response to and in accordance with temperature variations ambient only to said thermal switch.

7. Control apparatus for an electric motor having starting and running windings adapted to be connected to a source of electrical energy, of a switch having a thermal element in circuit with both windings of the motor and adapted in response to predetermined current flows therethrough to actuate the switch to control the starting circuit and to provide overload protection to the motor; and a separate circuit independent of the motor circuit adapted to effect operation of the switch by said thermal element independently of current conditions in the motor circuits, said separate circuit including a thermal member mechanically connected to said thermal element and adapted to move said element bodily, a transformer in circuit with the source of energy and also with said thermal member for energizing it and a thermal switch remote from the motor and in circuit with the transformer and thermal member and adapted, in response to variations in temperature ambient only to said thermal switch, to provide recurrent electrical impulses in said transformer and thermal member.

8. A control device for an electric motor having starting and running windings adapted to be connected to a source of electrical energy, a switch in circuit with said windings, a thermal element for actuating said switch in response to variations in current flow through said windings; a thermo-electric member mechanically connected to said thermal element; a transformer having windings in circuit with the source of energy and with said thermo-electric member; a thermal switch in circuit with the transformer and the thermo-electric member and remote from the motor, said switch being adapted to render the transformer effective to energize the thermo-electric member for bodily actuating the thermal element to actuate the switch in response to variations in temperature ambient to said thermal switch only; and manually operable means for adjusting the thermo-electric member to vary its current requirements and thereby also vary the temperature requirements ambient to the thermal switch necessary to effect actuation of the switch in circuit with the motor windings.

9. A control device for an electric motor adapted to be connected to a source of electrical energy comprising in combination, a switch having a thermo-electric actuator for operating said switch to control the motor in accordance with current flow therethrough; a conductor bar having one end anchored, the other end mechanically connected to the said thermo-electric actuator and adapted to expand when heated; a transformer having a winding connected to the source of energy and another in circuit with the conductor bar and adapted to energize and thereby heat it; and a thermal switch remote from the motor and in circuit with the transformer and conductor bar and adapted to render said transformer effective to energize the conductor bar to effect actuation of the motor control switch in response to a predetermined drop in temperature ambient to said thermal switch and to render the transformer ineffective, causing deenergization of the conductor bar to effect actuation of the motor control switch in response to a predetermined rise in the temperature ambient to said thermal switch.

10. A control device for an electric motor adapted to be connected to a source of electrical energy, comprising in combination, a switch for controlling the operation of the motor; a thermo-electric member adapted to effect actuation of said switch in accordance with current flow through the motor; a conductor bar adapted to expand in response to being heated, said bar being anchored at one end, the other end being mechanically attached to said thermo-electric member so as to actuate the switch through said member; an electric translating device in circuit with the source of energy and with said conductor bar and adapted to provide a current flow therethrough for heating it to effect actuation of the switch to stop the motor; and a temperature responsive switch in circuit with said translating device and conductor bar and remote from the motor for controlling the translating device to render it effective and ineffective to energize the conductor bar in response to predetermined low and high temperatures respectively, ambient to said temperature responsive switch.

11. A control device for an electric motor adapted to be connected to a source of electrical energy comprising in combination, a switch having a thermal actuator for operating the switch to control the motor in accordance with current flow therethrough; a transformer connected to the source of electrical energy; a thermal switch remote from and independent of the motor and connected to the transformer to control its effectiveness in accordance with varying temperatures ambient to said thermal switch; and a thermo-electric actuator mechanically connected to the thermal actuator of the motor control switch and electrically connected to the transformer circuit including the thermal switch and adapted to actuate the motor control switch through its thermal actuator in accordance with the operation of said thermal switch.

12. A control device for an electric motor adapted to be connected to a source of electrical energy comprising in combination, a transformer having one of its circuits connected to the source of energy; a thermal switch remote from the motor, in circuit with the second transformer circuit and adapted to control the effect of the second transformer circuit in accordance with the varying temperature ambient to said thermal switch; a conductor bar anchored at one end, said bar being in circuit with the second transformer circuit and thermal switch and adapted to expand or contract in accordance with current flow therethrough; and a motor control switch having an actuator adapted to operate said switch in accordance with current flow through the actuator and motor, said actuator being mechanically connected to the free end of said conductor bar which is thus adapted to move the motor control switch through said actuator and in response to the varying temperatures ambient to the thermal switch.

13. A control device for an electric motor having starting and running circuits adapted to be connected to a source of electrical energy, the combination with a switch for controlling said circuits; thermo-electric means in both motor circuits for actuating said switch in accordance with current flow therethrough; a second thermo-electric means independent of the motor circuits, connected to the first thermo-electric means and adapted to use it as a mechanical link to actuate said switch; a transformer connected to the source of energy for providing current flow to the second thermo-electric means to effect actuation of the switch; and a switch in circuit with the transformer and second thermo-electric means and adapted to control current flow from the transformer to the second thermo-electric means in accordance with temperature conditions ambient only to said last mentioned switch.

14. In a device of the character described, the combination with an electric motor having starting and running circuits adapted to be connected to a source of electrical energy; a switch adapted to control said circuits, said switch having a thermo-electric member adapted to actuate the switch in accordance with current flow through the motor circuits; a pivoted lever having said thermo-electric member attached to its one end; a conductor bar anchored at one end, its other end being secured to the other end of said lever, said bar expanding or contracting in accordance with its temperature, a transformer connected to the source of energy and having a winding in circuit with said bar and adapted to energize it to heat it; and a temperature responsive switch, remote from the motor and in circuit with the transformer and bar and adapted to control energization of said bar by the transformer in accordance with varying temperatures ambient to said temperature responsive switch for effecting actuation of the motor controlling switch by the said bar acting through the pivoted lever and thermo-electric member.

15. In a device of the character described, the combination with an electric motor having starting and running circuits adapted to be connected to a source of electrical energy; a switch for controlling said circuits; a manually adjustable anchorage; a pivoted lever, two thermo-electric members, one of which is connected between one end of said lever and the switch and being connected with both motor circuits and energized thereby for actuating the switch in accordance with current flow through said circuits, the other member being connected between the other end of the pivoted lever and said anchorage and adapted when energized to move said lever to actuate the switch through the said one member acting as a mechanical link; means independent of the motor and connected to the source of electrical energy for energizing said other member; and a thermal switch for controlling the effect of said energizing means in accordance with temperatures ambient to said thermal switch which is remote from the motor.

CALVIN J. WERNER.
WILLIAM E. MENZIES.